United States Patent
Fries et al.

(10) Patent No.: US 9,191,454 B2
(45) Date of Patent: Nov. 17, 2015

(54) HOST ENABLED MANAGEMENT CHANNEL

(75) Inventors: Robert Fries, Kirkland, WA (US); Srivatsan Parthasarathy, Seattle, WA (US); Ashvinkumar Sanghvi, Sammamish, WA (US); Aravind Ramarathinam, Seattle, WA (US); Michael Grier, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 411 days.

(21) Appl. No.: 13/169,024

(22) Filed: Jun. 27, 2011

(65) Prior Publication Data

US 2012/0331461 A1 Dec. 27, 2012

(51) Int. Cl.
*G06F 9/455* (2006.01)
*H04L 29/08* (2006.01)
*G06F 9/54* (2006.01)

(52) U.S. Cl.
CPC ........ *H04L 67/2861* (2013.01); *G06F 9/45558* (2013.01); *G06F 9/54* (2013.01); *H04L 67/2814* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,424,710 B1 | 9/2008 | Nelson | |
| 7,434,003 B2 | 10/2008 | Oney | |
| 2005/0268298 A1* | 12/2005 | Hunt et al. | 718/1 |
| 2007/0180448 A1 | 8/2007 | Low | |
| 2008/0086726 A1 | 4/2008 | Griffith et al. | |
| 2009/0049453 A1 | 2/2009 | Baran et al. | |
| 2009/0070776 A1 | 3/2009 | Dahlstedt | |
| 2009/0265706 A1 | 10/2009 | Golosovker et al. | |
| 2009/0287571 A1 | 11/2009 | Fujioka | |
| 2010/0017519 A1* | 1/2010 | Han et al. | 709/227 |
| 2010/0198972 A1* | 8/2010 | Umbehocker | 709/226 |
| 2010/0306381 A1 | 12/2010 | Lublin | |
| 2011/0004876 A1* | 1/2011 | Wu et al. | 718/1 |
| 2011/0126110 A1 | 5/2011 | Vilke et al. | |
| 2011/0131330 A1* | 6/2011 | Beaty et al. | 709/227 |
| 2012/0102562 A1* | 4/2012 | Chokshi et al. | 726/12 |
| 2012/0291028 A1* | 11/2012 | Kidambi et al. | 718/1 |

FOREIGN PATENT DOCUMENTS

WO 2007087558 A2 8/2007

OTHER PUBLICATIONS

Microsoft Computer Dictionary; Mar. 15, 2002; ISBN: 978-0-7356-1495-6.*

(Continued)

*Primary Examiner* — Dong Kim
(74) *Attorney, Agent, or Firm* — Henry Gabryelski; Kate Drakos; Micky Minhas (57) ABSTRACT

A logical communication path is provided between a target virtual machine (VM) and a host or application communicating with the VM. The target VM runs on a hypervisor host that has a hypervisor and a proxy agent. The hypervisor manages execution of the VM. A mapping is maintained indicating which VMs execute on which hosts. When the host or application is to send a message or packet to the target VM, the mapping is consulted and the hypervisor host hosting the target VM is identified. The message or packet, which may identify the target VM, is transmitted to the hypervisor host. A proxy agent at the hypervisor host selects a communication channel between the hypervisor and the target VM. The hypervisor then passes the message or packet through the selected channel to the target VM.

18 Claims, 6 Drawing Sheets

RELATED ART (56) References Cited

OTHER PUBLICATIONS http://web.archive.org/web/20100530202132/http://en.wikipedia.org/wiki/Channel_(communications); May 30, 2010.*
http://web.archive.org/web/20110503032912/http://en.wikipedia.org/wiki/HyperText_Transfer_Protocol; May 3, 2011.*
Brakmo et al.; TCP Vegas: New techniques for congestion detection and avoidance; In Proc. ACM SIGCOMM, pp. 24-35, Aug. 1994.
Chen et al.; Utility Maximization in Peer-to-Peer Systems; Microsoft Research Technical Report, Aug. 2007.
Floyd et al.; Equation-based congestion control for unicast applications; In Proc. ACM SIGCOMM, pp. 43-56, Stockholm, Sweden, Aug. 2000.
Floyd et al.; The NewReno Modification to TCP's Fast Recovery Algorithm, Apr. 1999. RFC 2582.
Ha et al.; Cubic: A new tcp-friendly high-speed tcp variant; ACM SIGOPS Operating System Review, 42(5):64-74, Jul. 2008.
Handley et al.; Tcp friendly rate control (tfrc): Protocol specification; RFC-3448, Jan. 2003.
Jacobson; Congestion avoidance and control; In Proc. ACM SIGCOMM, pp. 314-329, Stanford, CA, Aug. 1988.
Jain et al.; End-to-end available bandwidth: Measurement methodology, dynamics, and relation with TCP throughput; IEEE/ACM Trans. Networking, 11:537-549, Aug. 2003.
Jain et al.; Ten fallacies and pitfalls on end-to-end available bandwidth estimation; In IMC, 2004.
Kelly; Fairness and stability of end-to-end congestion control; European Journal of Control, 9:159-176, 2003.
Kelly et al.; Rate control for communication networks: shadow prices, proportional fairness, and stability; Journal of the Operational Research Society, 49:237-252, 1998.
Low et al.; Optimization flow control, i: Basic algorithm and convergence; IEEE/ACM Trans. Networking, 7(6):861-875, Dec. 1999.
Mehrotra et al.; Hybrid window and rate based congestion control for delay sensitive applications; In Proc. of IEEE Globecom. IEEE, Dec. 2010.
Strauss et al.; A measurement study of available bandwidth estimation tools; In IMC, Oct. 2003.
Tan et al.; A compound TCP approach for high-speed and long distance networks; In INFOCOM, pp. 1-12. IEEE, Apr. 2006.
Zheng et al.; Error-resilient coding of H.264 based on periodic macroblock; IEEE Transactions on Broadcasting, 52:223-229, Jun. 2006.
UltraSPARC Virtual Machine Specification Date Published May 29, 2008.
Design and Implementation of a Portable ID Management Framework for a Secure Virtual Machine Monitor Date Published 2007.
Chapter 2: Hyper-V Overview Date Published Dec. 20, 2010.
"International Search Report", Mailed Date: Jan. 31, 2013, Application No. PCT/US2012/041043, Filed Date: Jun. 6, 2012, pp. 9.
"Extended European Search Report Issued in European Patent Application No. 12804372.6", Mailed Date: Jul. 6, 2015, 10 Pages.

* cited by examiner

RELATED ART

FIG. 1

RELATED ART

FIG. 2

Related Art

HOST ENABLED MANAGEMENT CHANNEL

BACKGROUND

In the field of machine virtualization, virtual machines (VMs) have network functionality. That is, VMs may implement a network protocol stack to communicate via a network with other VMs or physical machines. For instance, virtualization hosts (e.g., Hyper-V™ hosts) may form part of a virtualization fabric that hosts guest VMs, where a Fabric Controller manages the virtualization fabric (as used in this Background "host" may refer to a Fabric Controller, for example, or any other computer). However, for various reasons, there may be no network connectivity between a host on a network and a VM, even though there is network connectivity between the host and a machine running the VM (to referred to as the "VM host"). For example, the VM might be on a Virtual Private Network (VPN) to which the host does not belong and the VM's network address may not be valid on the host's network. A firewall might block access to the VM from the hosts' network while allowing access on the VM host's network. A VM might simply be on a different network than the host that might need to communicate with the VM.

In some circumstances, it is desirable to communicate with a VM using a standard protocol such as HTTP (Hypertext Transfer Protocol), SOAP (Simple Object Access Protocol), WMI™ (Windows Management Instrumentation), the WS-Management protocol (transporting WMI calls over a SOAP based protocol via HTTP), and so forth. For example, in some data centers or clouds, VMs might have network agents or services running thereon that perform management functions (such as applying patches to a guest operating system, handling cloud fabric tasks, etc.), perhaps with one or more communication channels for control (e.g., WMI over HTTP) or data (BITS via HTTP). These management services or agents are controlled by a management application (e.g., a Fabric Controller), running on a controller host, for example. The management application sends packets, for example HTTP packets, to the VM's network address and the HTTP packets are delivered to the management agent. The management agents may perform functions in response to information in the payloads of the packets. However, when the management application does not have network connectivity to the VM, it is unable to invoke the management agents on the VM.

Techniques to enable communication with VMs via communication channels between hypervisors and the VMs are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A logical communication path is provided between a target virtual machine (VM) and a host or application communicating with the VM. For example, a path between virtualization host and a VM. The target VM runs on a hypervisor host that has a hypervisor and a proxy agent (e.g., an HTTP proxy). The hypervisor manages execution of the VM. A mapping is maintained indicating which VMs execute on which hosts. When the host or application is to send a message or packet to the target VM, the mapping is consulted and the hypervisor host hosting the target VM is identified. The message or packet, which may identify the target VM, is transmitted to the hypervisor host. A proxy agent at the hypervisor host selects a communication channel between the hypervisor and the target VM. The hypervisor then passes the message or packet through the selected channel to the target VM.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to using internal communication channels on a VM/hypervisor host to allow external network communication. Discussion will begin with an overview of virtualization technology and virtualization layers (to also be referred to as hypervisors). An example of network communication between an application and a VM will be described next. An overview of a logical communication path using private channels on a hypervisor host will be explained. Finally, details of such a communication path will be described in detail, including an application at one end of the communication path and a hypervisor host (VM host) at another end of the communication path.

Machine Virtualization

Figure 1:
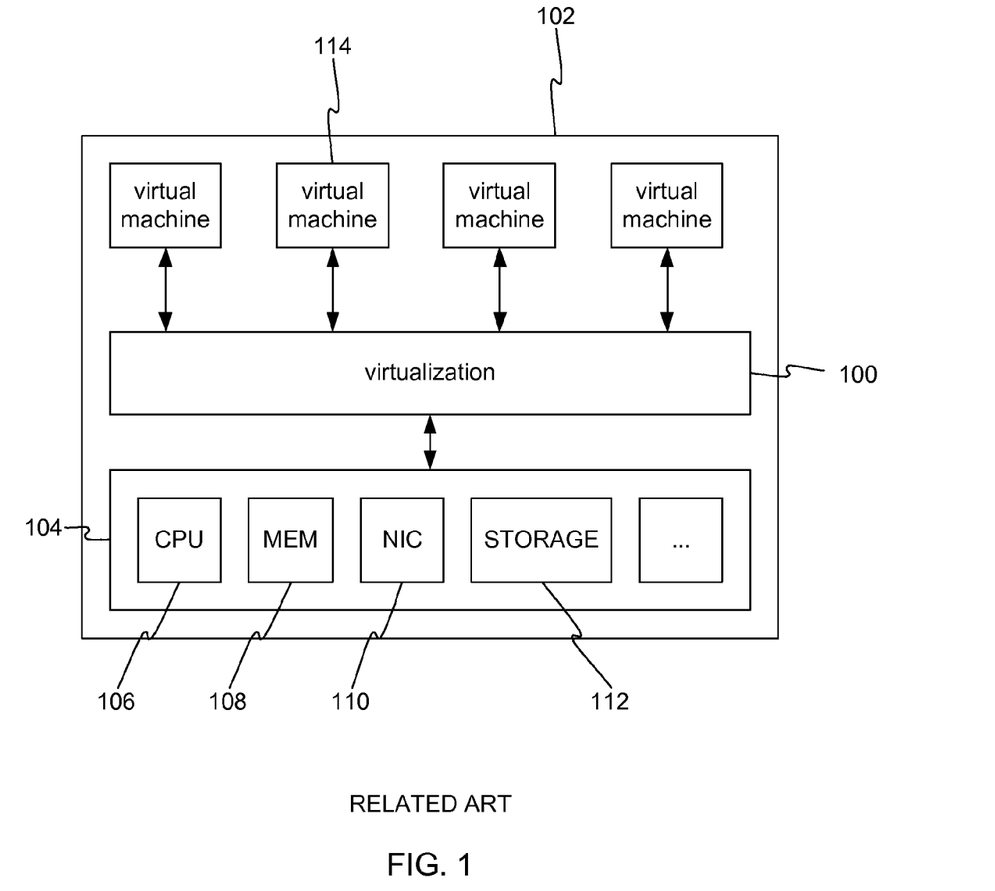
FIG. 1 shows an example virtualization layer.

FIG. 1 shows an example virtualization layer 100. A computer 102 has hardware 104, including a central processing unit (CPU) 106, memory 108, a network interface 110, non-volatile storage 112, and other components not shown, such as a bus, a display adapter, etc. The virtualization layer 100 manages and facilitates execution of virtual machines 114. Although not shown in FIG. 1, each virtual machine 114 typically has an associated virtual disk image and a guest operating system. For brevity, the operating system and perhaps application software of a virtual machine 114 will sometimes be referred to as a guest, which is stored and executed from the virtual disk image associated with the virtual machine 114. For convenience, the term "hypervisor" will be used herein to refer to the various forms of virtualization layers. Moreover, as will be discussed below, virtual machines 114 are used to host elements of distributed applications.

The virtualization layer 100 may be of any variety of known or future implementations, such as Hyper-V Server™, VMWare ESX Server™, Xen, Oracle VM™, etc. The architecture of the virtualization layer may be a hosted type, with a virtual machine monitor (VMM) running on a host operating system, or a bare-metal type with a hypervisor or the like running directly on the hardware 104 of the computer 102. As used herein, the term "virtual machine" refers to a system-type virtual machine that simulates any specific hardware architecture (e.g., x86) able to run native code for that hardware architecture; to the guest, the virtual machine may be nearly indistinguishable from a hardware machine. Virtual machines discussed herein are not abstract or process-type virtual machines such as Java Virtual Machines.

The virtualization layer 100 performs the basic function of managing the virtual machines 114 and sharing of the hardware 104 by both itself and the virtual machines 114. Any of a variety of techniques may be used to isolate the virtual machines 114 from the hardware 104. In one embodiment, the virtualization layer may provide different isolated environments (i.e., partitions or domains) which correspond to virtual machines 114. Some of the virtualization layer 100 such as shared virtual device drivers, inter virtual machine communication facilities, and virtual machine management APIs (application programming interfaces), may run in a special privileged partition or domain, allowing for a compact and efficient hypervisor. In other embodiments, functionality for virtual machine management and coherent sharing of the hardware 104 may reside in a monolithic on-the-metal hypervisor.

Figure 2:
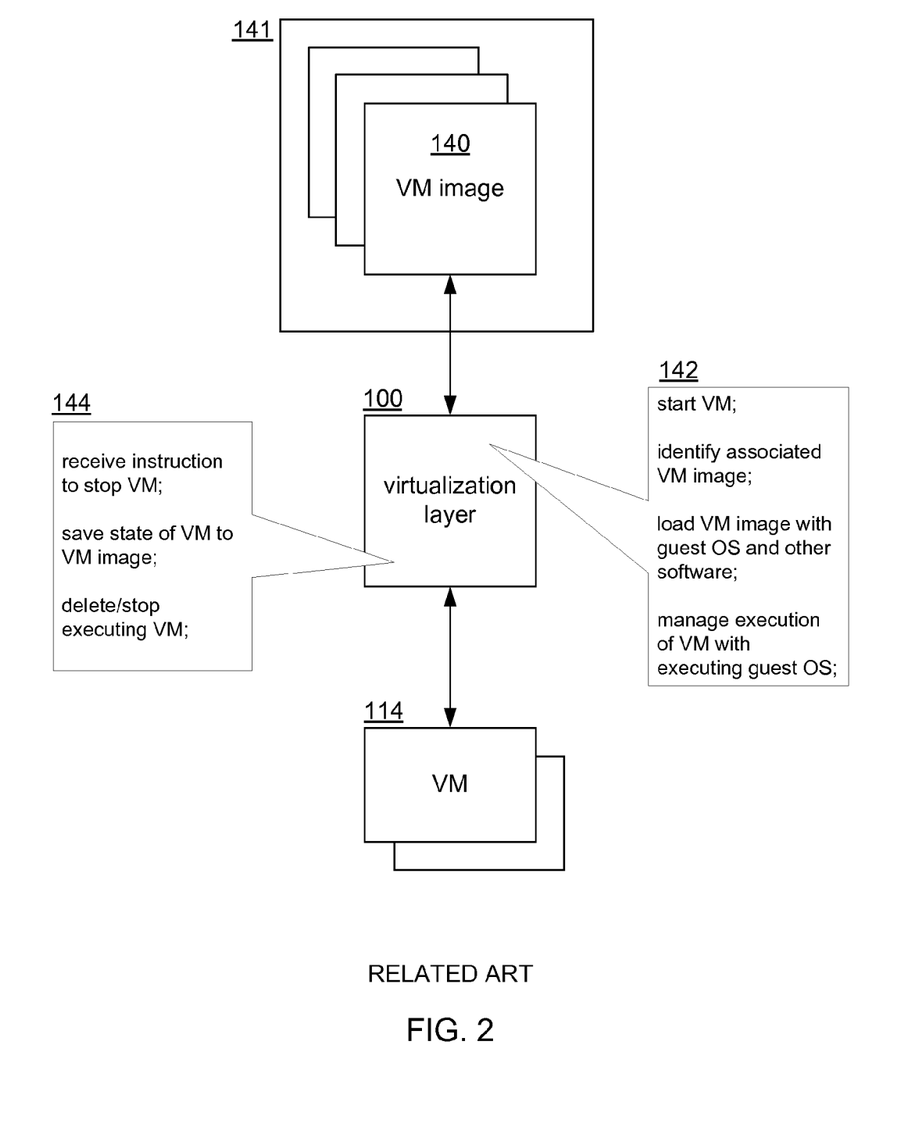
FIG. 2 shows processes and interactions of virtualization a layer in relation to virtual machines and virtual machine images.

FIG. 2 shows processes and interactions of virtualization layer 100 in relation to virtual machines 114 and virtual machine images 140. The virtualization layer 100 performs a process 142 of starting and executing a virtual machine 114, possibly according to corresponding virtual machine configuration parameters. When a virtual machine 114 (VM) is started, the virtualization layer identifies an associated virtual machine image 140. In practice, any virtual machine image 140 can be used by any virtual machine 114. The virtual machine image 140 may be a specially formatted file (e.g., a VHD) on a file system 141 of the virtualization layer 100. The virtualization layer 100 loads the identified virtual machine image 140. The started virtual machine 114 mounts and reads the virtual machine image 140, perhaps seeking a master boot record or other boot information, and boots a guest operating system which begins executing.

The virtualization layer 100 manages execution of the virtual machine 114, handling certain calls to the guest's kernel, hypercalls, etc., and coordinating the virtual machine 114's access to the underlying hardware 104. As the guest and its software run, the virtualization layer 100 may maintain state of the guest on the virtual disk image 140; when the guest, or an application run by the guest, writes data to "disk", the virtualization layer 100 translates the data to the format of the virtual disk image 140 and writes to the image.

The virtualization layer 100 may perform a process 144 for shutting down the virtual machine 114. When an instruction is received to stop the virtual machine 114, the state of the virtual machine 114 and its guest is saved to the virtual disk image 140, and the executing virtual machine 114 process (or partition) is deleted. A specification of the virtual machine 114 may remain for a later restart of the virtual machine 114.

Overview of Communication to a Virtual Machine

Figure 3:
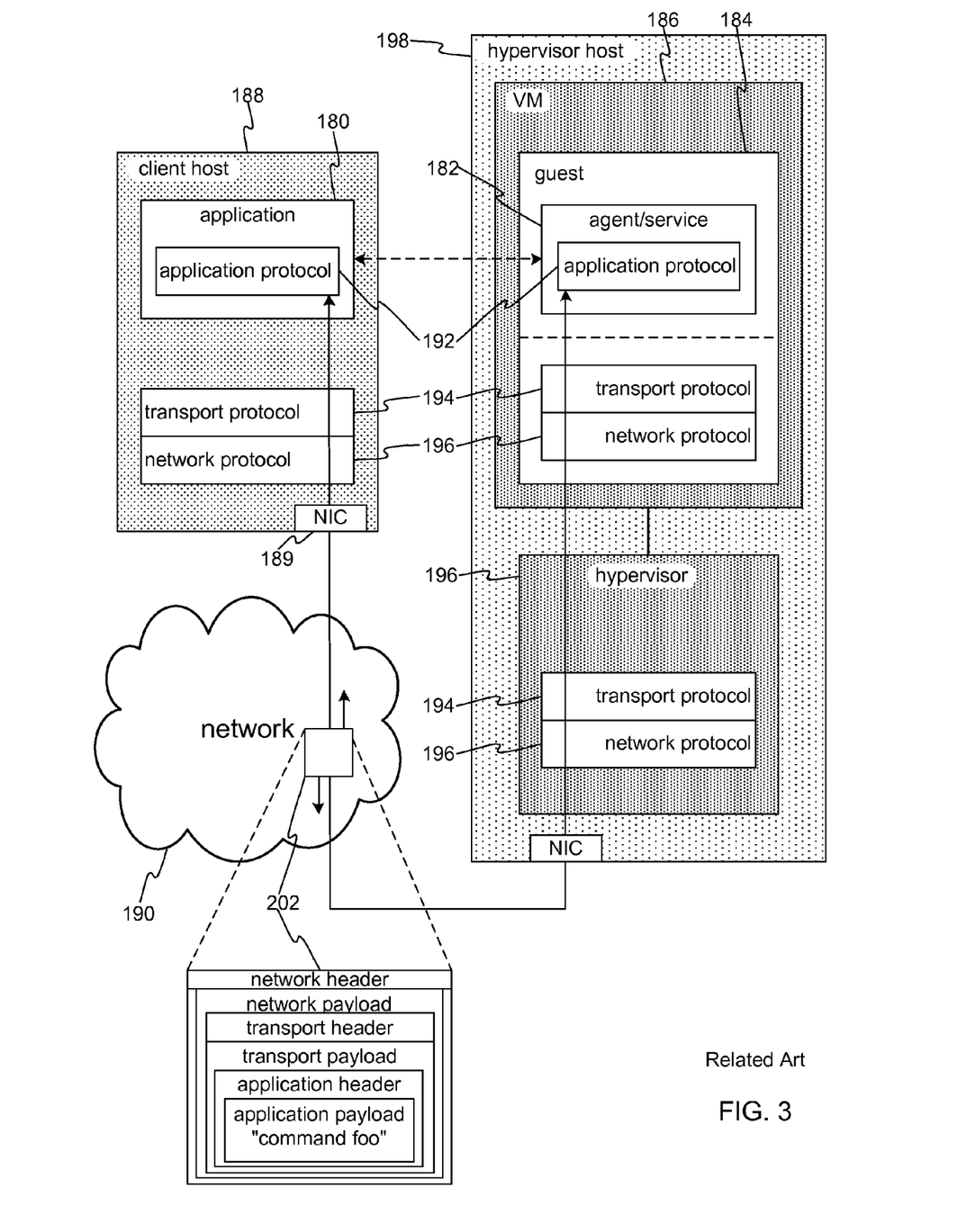
FIG. 3 shows an example of an application communicating with an agent running on a guest operating system hosted by a VM.

FIG. 3 shows an example of an application 180 communicating with an agent 182 running on a guest operating system (guest 184), hosted by a VM 186. The application 180, which may be a management application, for example, runs on a client host 188, which may be an ordinary computer with a network interface card (NIC) 189 to allow communication via a network 190. The client host 188 has a protocol stack comprised of various protocol implementations, including an application protocol implementation 192 (implemented by the application 180), a transport protocol implementation 194, and a network protocol implementation 196.

The guest 184 also has implementations of the above-mentioned protocols, as does hypervisor 196 on hypervisor host 198. The hypervisor host 198 is a computer running the hypervisor 196, which manages execution of the VM 186. The agent 182 (also referred to as "guest agent 182") resides on the guest 184 and may implement the same application protocol implemented by the application 180. The application 180 and guest agent 182 may be any variety of software, for instance background network services, interactive applications, executables, components of larger applications or suites, and so forth. In one embodiment, the application 180 is a virtual machine management application that manages VMs, and the agent 182 performs management functions in accordance with communications with the application 180.

Execution of the VM 186 is managed by the hypervisor 196, which may manage other VMs not shown in FIG. 3. In a case where direct connectivity between client host 188 and VM 186 is possible, the application 180 and agent 182 communicate via the network 190 as follows. The application 180 forms an application message according to the application protocol 192 (e.g., an HTTP packet or message). The application 180 requests its local operating system to send the message to the network address (e.g., HTTP address) of the hypervisor host 198. The protocol stack of the local operating system opens a connection to the hypervisor host 198, encapsulates the application 180's message in a transport payload and the transport payload within a network packet 202. The network header thereof (which contains the network address of the hypervisor host 198) is routed through the network 190 to the hypervisor host 198. The hypervisor host 192 may pass the packet 202 to the VM 186 and in turn to the guest 184 and guest agent 182. Along the way, various payloads are extracted by the respective protocol implementations, and the guest agent 182 receives the transmitted application message (e.g., "command foo"). The process is similar but reversed when the guest agent 182 transmits an application message to the application 192.

As used herein, the terms "client", "client host", "application", and "agent", "hypervisor", and "hypervisor host" are used in their broadest senses. The particular platforms and software that communicate using techniques described herein are of minor significance. In fact, it may be notable that existing application-level software and protocols may use the communication techniques described below without significant modification (if any), in particular at the end that is communicating with a VM via a network (e.g., application 180). Moreover, while the HTTP, IP (Internet Protocol), and TCP/UDP (Transmission Control protocol/Universal Datagram Protocol) protocols are sometimes mentioned for illustration, the communication techniques described below may work with any standard networking protocols or versions thereof (e.g., SOCKS). Furthermore, for brevity, "HTTP", will is deemed to refer to versions or variants of HTTP as well as HTTPs (HTTP Secure).

Logical Communication Path, Application and Hypervisor Embodiments

Figure 4:
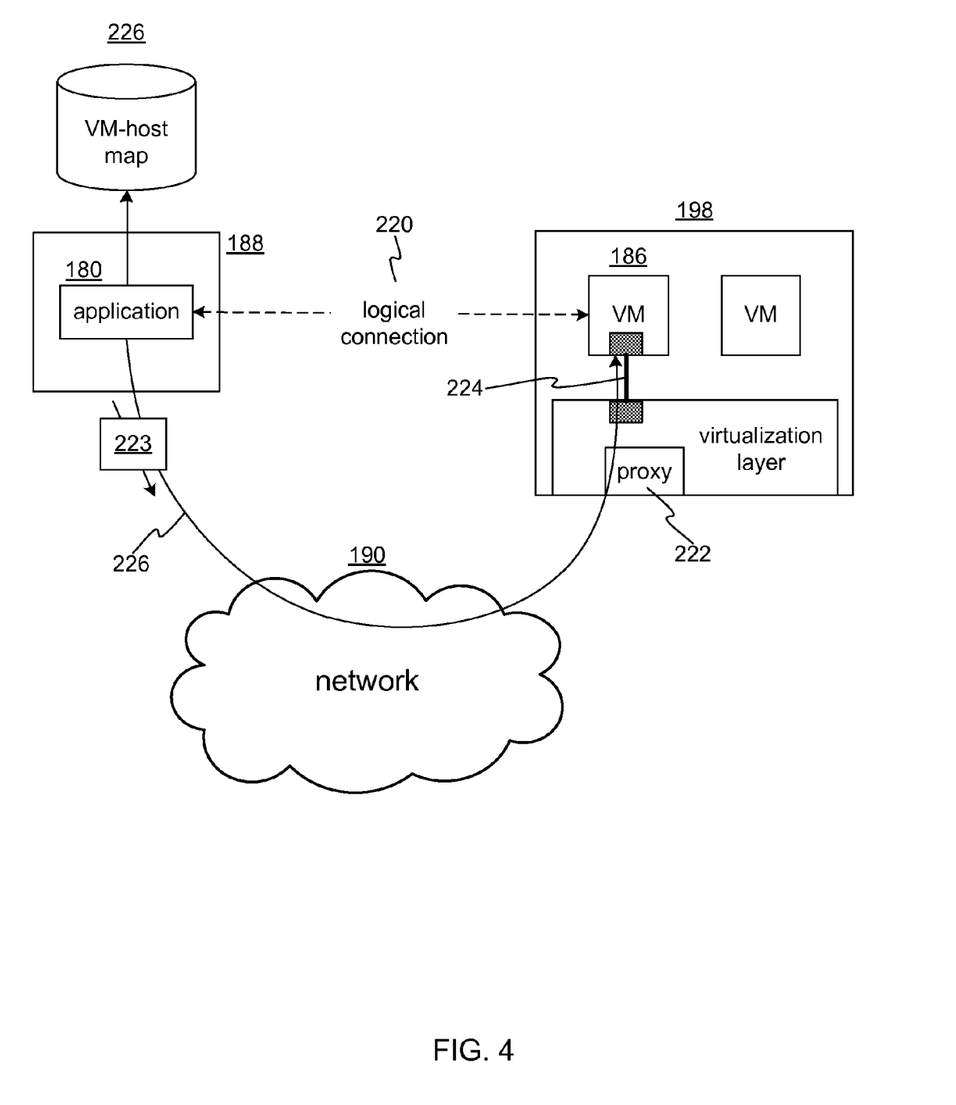
FIG. 4 shows an overview of a logical communication path between application and a VM.

FIG. 4 shows an overview of a logical communication path 220 between application 180 and VM 186. A proxy agent 222 on the hypervisor host 198 bridges the client host 188 with the VM 186. It may be assumed that the VM 186 and the client host 188 have the necessary networking components (e.g., protocol stacks) to communicate, but are unable to communicate directly. For example, the network 190 may be unable to route network packets between them (e.g., either may be unaddressable on the network 190). However, at the client host 188, a network packet 223 may be directed to a network address of the virtualization layer (an address of the hypervisor host 198). When the packet 223 is received, the proxy agent 222 determines that the packet 223 is meant to be received by the VM 186 and causes the virtualization layer (hypervisor) to pass the packet through a private or local communication channel 224 to the VM 186.

In one embodiment, a VM-host map 226 contains information indicating which VMs reside on which hypervisor hosts. The client host 188 may use a known identifier of the VM 186 (possibly known by the application 180) to look up the network address of the hypervisor host 198 in the VM-host map 226. The identifier may be added to the packet 223 for use by the proxy agent 22. The client host 188 sends the packet 223 to the looked-up network address of the hypervisor host 198, which the network 190 uses to route 226 the packet 223 to the hypervisor host 198. As mentioned above, the proxy agent 222 uses the identifier of the VM 186 (e.g., from an HTTP CONNECT header) to cause the virtualization layer to pass the packet 223 to the VM 186.

Figure 5:
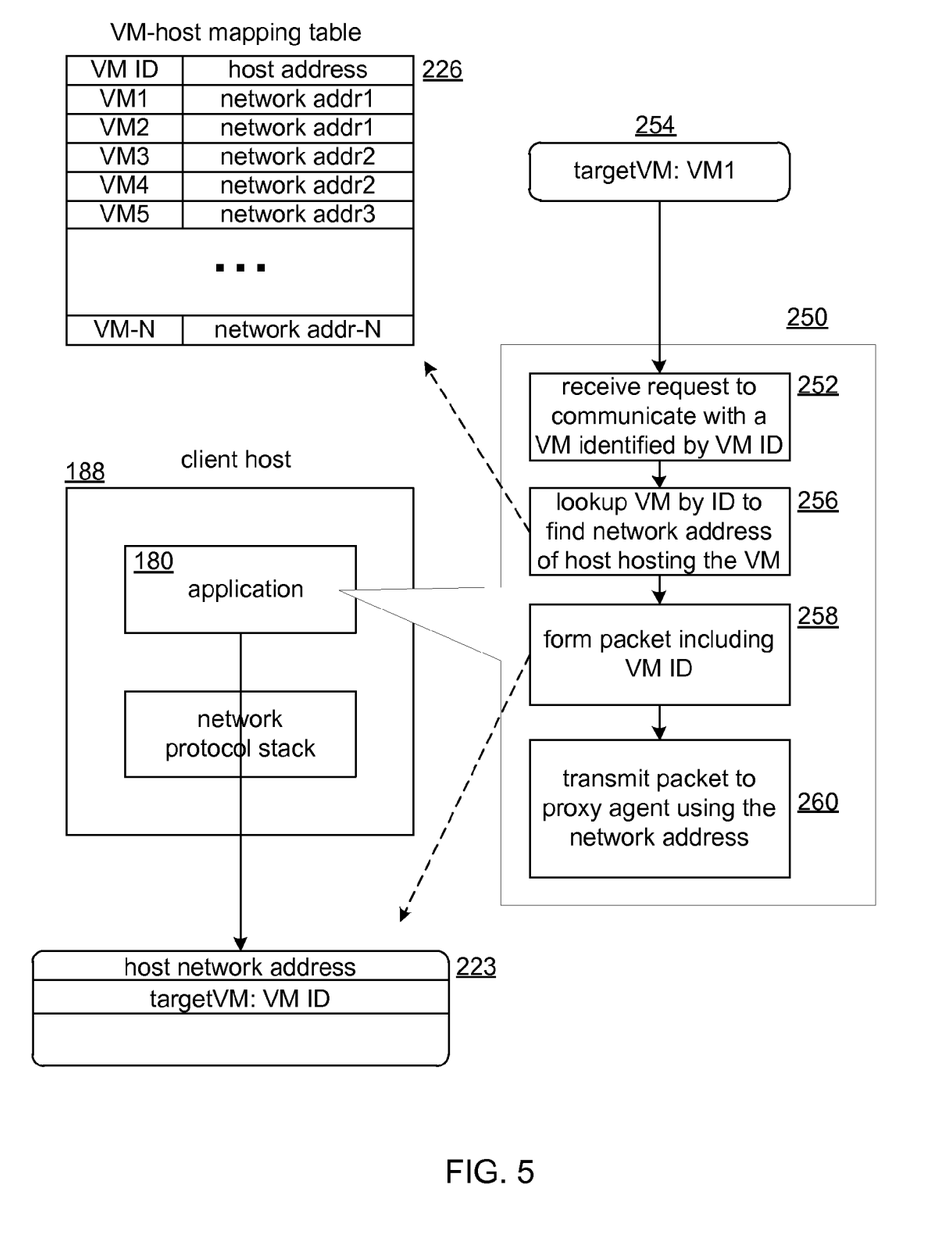
FIG. 5 shows a client host initiating a connection with a VM.

FIG. 5 shows client host 188 initiating a connection with VM 186. The client host 188 has access to the VM-host map 226. The client host 188 performs a process 250 for communicating with the VM 186. At step 252, a request 254 is received to communication with the particular VM 186, perhaps as part of the logic of application 180, or possibly received from an external entity. At step 256 an identifier of the VM 186 (e.g., "VM1" in FIG. 5) is used to lookup the host on which VM 186 resides; hypervisor host 186. The lookup may return a network address or network hostname of the hypervisor host 198 (as used herein "network address" is assumed to include both numeric addresses as well as hostnames that can be resolved to numeric addresses). At step 258 packet 223 is formed, including the substantive payload (e.g., an application-protocol message). In an embodiment where HTTP is used, the packet 223 formed at step 258 is an HTTP packet and the hypervisor host's network address is included in the HTTP header. At step 260 the packet 223 is transmitted to the network 190 using the hypervisor's network address ("network addr1" in FIG. 5", for example "128.1.2.3").

In one embodiment, process 250 may be performed fully or partly by the application 180. In another embodiment, the application 180 may act as a proxy or service for other applications that are to communicate with VM 186. Those applications pass the application 180 a VM identifier and a message body and the application 180 builds a packet for the body, adds the VM identifier, and transmits the packet to the corresponding hypervisor host. In yet another embodiment, rather than maintaining a lookup table (VM-host map 226), the VM identifiers may be globally unique hostnames registered with a DNS (Domain Name Service) server (possibly with local or limited scope to avoid conflicts) that maps to the network addresses of the hypervisor hosts that correspond to the VMs. In which case, when an application or client host wishes to communicate with a VM, it looks up the VM's identifier (e.g., a "fake" DNS name) via the local DNS server to obtain the correct hypervisor host's network address.

The form of the VM identifiers is not important as long as the proxy agent 222 and the client hosts/applications share the same names. The system may use any convention for naming VMs, for example a custom URI (Universal Resource Identifier) format such as "host#:vm#".

Figure 6:
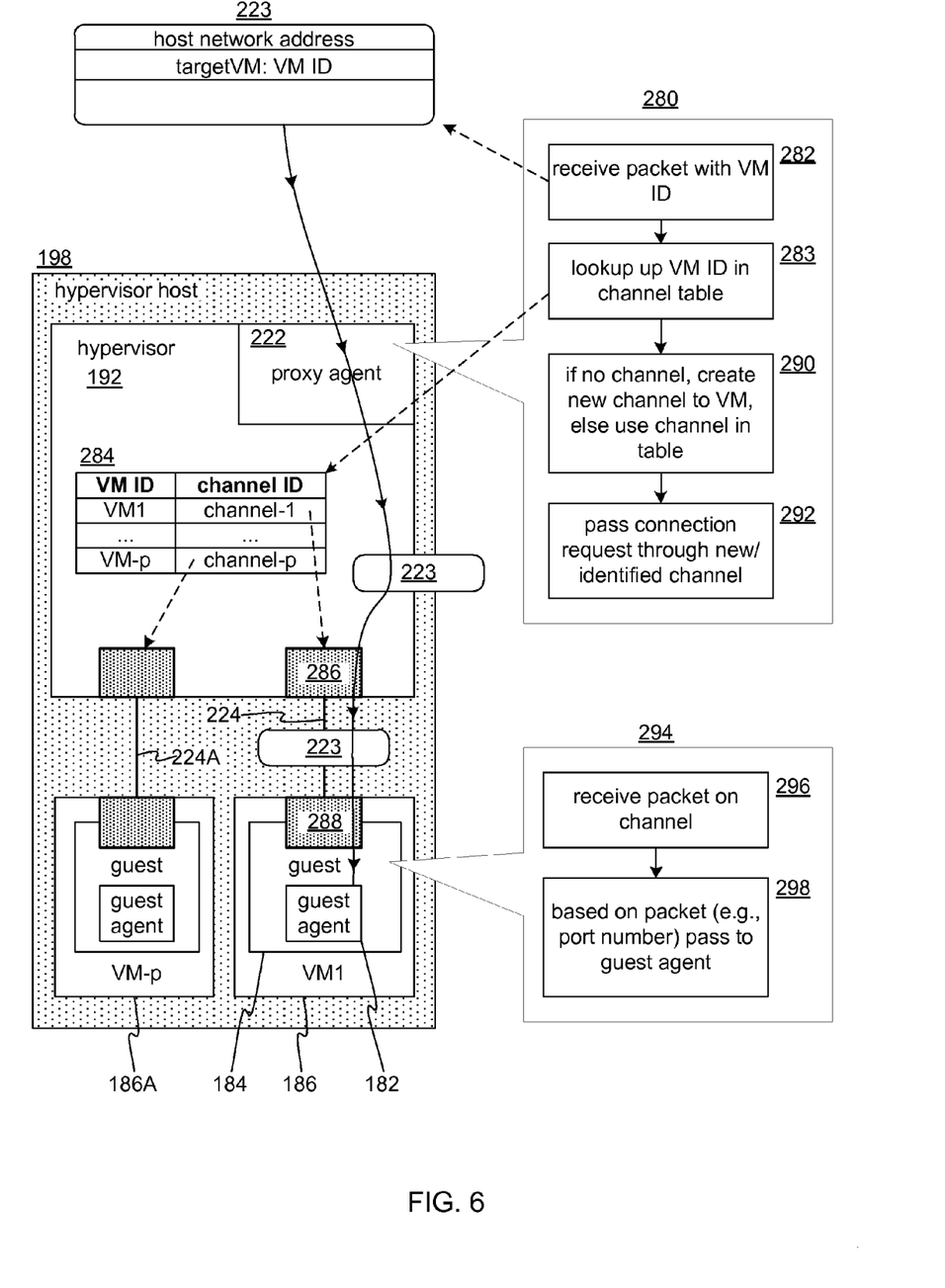
FIG. 6 shows a hypervisor host handling a packet from client host.

FIG. 6 shows hypervisor host 198 handling packet 223 from client host 188. The proxy agent 222 operates in conjunction with the virtualization layer or hypervisor 192 to perform process 280. At step 282 the hypervisor host 198 receives packet 223, which includes the VM identifier (e.g., "VM1", "host1:VM1", etc.) of the target VM; VM 186. The proxy agent 222 extracts the VM identifier, and at step 283 looks up the VM identifier in a channel table 284. The channel table 283 maps communication channels 224, 224A to respective VMS 186, 186A. Each communication channel 224, 224A may have a pair of communication end points, including a hypervisor-side end point 286 and a VM-side end point 288 (in one embodiment the VM-side end point 286 is a virtual NIC of the VM 186). If step 283 discovers no communication channel, a step 290 is performed and a new channel is created. A reference to the new channel is then added to the channel table 284. Note that a virtual NIC, or management NIC, may be a virtual bus network adapter connected to an internal network switch to which the host and VMs are connected; VMs having automatic internal IP addresses (e.g., in the 169 range). In one embodiment, an ACL (access control list) is maintained in association with the internal network switch to prevent each of the guest VMs from communicating with each other without permission; host-to-VM communication is allowed but VM-VM communication is disallowed absent explicit permission in the ACL.

Having identified the correct communication channel 224 for the packet 223, at step 292 the hypervisor 192 and/or proxy agent 222 passes the packet 223 to communication channel 224. In turn, the VM 186 performs process 294. At step 296 the guest 184 receives the packet 223. At step 298, based on the packet 223, the guest 184 passes the packet 223 to the guest agent 182, which proceeds to service the substantive content of the packet 223 (e.g., executes "command foo"). For example, the application-protocol type of the packet 223 (e.g. HTTP) might be mapped by the guest to a port number that the guest agent 182 listens on. That is, the guest agent 182 may listen on specific ports (e.g., a designated WS-Management port 5986 for management, a BITS port 8114 for data, etc.). The proxy agent 222 (e.g., HTTP proxy) listens on the same ports (5986, 8114) of the external IP addresses (of the hypervisor host 186). The proxy agent 222 then forwards any incoming traffic onto the corresponding ports in the guest VMs, thus allowing multiplexing of various control and data traffic onto the guest VMs.

Regarding the communication channels, in one embodiment the communication channels are based on the same network and/or transport protocols used to deliver the packet 223 to the hypervisor host 198. In effect, a communication channel may be a limited private network connection between the hypervisor host 192 and the VM 186. In another embodiment, the proxy agent 222 may look into the packet 223 and change header information or otherwise modify the packet 223 before forwarding the packet 223 to the VM 186.

In effect, from the viewpoint of application 180 and guest agent 182, the two are able to exchange application-level communications using ordinary network communication protocols and addresses, much as they might when a VM is directly accessible or addressable from the client host 188. With regard to receiving packets, the proxy agent 222 functions much as known proxies function.

As mentioned above, communications may also originate from within the guest or guest 184 agent 182 and be passed through the communication channel and virtualization layer to the proxy agent 222. For example, the guest agent 182 may be configured with a network address of client host 188. The proxy agent 222 in turn transmits the guest-originated packet to the client host 188.

In one embodiment, in order to provide visibility of VMs, hypervisor hosts (hosts on which VMs execute) may self-register a VM when a VM is created. For example, a hypervisor host might add a new entry to VM-host mapping table 226 for a new VM, identifying the host and the new VM.

CONCLUSION

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of providing application-level connectivity between a target virtual machine (VM) managed by a hypervisor on a first host and an application running on a second host, the method performed by the first host, the method comprising:
    receiving, via a physical network at the first host, an application-level connection request message conforming to an application-level communication protocol and sent by the application, the application-level connection request message comprising a VM identifier identifying the target VM, the application-level connection request message received via the physical data network between the first host and the second host by the second host having sent the connection request message in one or more first network-level packets addressed to a network address of the first host, the one or more first network-level packets containing the application-level connection request message, the one or more first network-level packets having been routed from the second host to the first host by the physical network according to the network address of the first host in the first network-level packets;
    responding, by the hypervisor, to the application-level connection request message, wherein the responding comprises, based on the VM identifier in the application-level connection request message, initiating, by the hypervisor, a communication channel between the hypervisor managing the target VM and the target VM, the communication channel comprising a communication path between the target VM and the hypervisor with endpoints at the target VM and the hypervisor;
    receiving, by the hypervisor, one or more second network-level packets comprising payloads comprising application-level messages that include the VM identifier, the second network-level packets having been routed from the second host to the first host by the physical data network according to the network address of the first host, wherein the first and second network-level packets are unrouteable at the network level from the second host to the VM; and
    based on the VM identifier in the application-level messages, passing, by the hypervisor, the application-level messages through the communication channel based on the network address of the target VM and in response a network stack of the target VM extracts the application-level messages and provides the application-level messages to a local application executing on the target VM.

2. A method according to claim 1, wherein the endpoints of the communication channel are directly accessible to only the hypervisor and the target VM such that another VM on the first host cannot use the communication channel to communicate with the target VM without authorization.

3. A method according to claim 1, wherein the network address of the first host comprises a first Internet Protocol (IP) address, the second host has a second IP address, and the network address of the target VM comprises a third IP address, wherein first and second network-level packets are unable to be IP-routed from the second IP address to the third IP address.

4. A method according to claim 3, wherein the first and second network-level packets comprise IP packets, and wherein the method further comprising sending the IP packets from the second host to the first host by the second host addressing the packets to the first IP address.

5. A method according to claim 4, the method further comprising delivering the extracted application-level messages to an agent executing on the target VM.

6. A method according to claim 1, wherein the communication channel comprises an internal network switch of the hypervisor and a virtual network interface card provided by the hypervisor and assigned to the target VM.

7. A method according to claim 1, wherein the hypervisor and a proxy agent on the first host cooperate to allow the second host to communicate with the target VM using a standard network protocol.

8. One or more physical computer-readable storage devices storing information to enable a computer to perform a process, the process comprising:
    executing a virtual machine (VM) and a guest operating system of the VM, wherein the VM comprises a network stack comprising an implementation of a network-level protocol and an implementation of a transport protocol to enable connectivity for the guest operating system according to a network address of the VM, and wherein execution of the VM is managed by a hypervisor on the computer;
    executing an agent by the hypervisor on the computer; and
    receiving one or more network-level packets at the hypervisor on the computer, the one or more network-level packets conforming to the network-level protocol and having been routed, via a physical data network, to a network address of the hypervisor on the computer according to the network-level network protocol, the one or more network-level packets comprising one or more respective payloads, the one or more payloads comprising one or more application-level messages that comprise information identifying the VM, wherein the agent parses the one or more application-level messages and determines from the information therein identifying the VM that the VM is to receive the one or more application-level messages, and in response the hypervisor passes the one or more application-level messages to the VM through a communication channel between the VM and the hypervisor, wherein the network stack provides the one or more application-level messages to application-level code executing on the VM, wherein the one or more network-level packets are unable to be routed to the network address of the VM by the physical data network according the network-level protocol.

9. One or more computer-readable storage devices according to claim 8, wherein a plurality of VMs communicate on the physical data network, the process further comprising maintaining, at the computer, host information indicating which of the VMs reside on the computer.

10. One or more computer-readable storage devices according to claim 9, the process further comprising selecting the computer based on the host information.

11. One or more computer-readable storage devices according to claim 10, wherein the information identifying the VM comprises an identifier of the VM, the selecting comprising using the identifier of the VM in the packets to determine that the network-level packets are to be addressed to the network address of the hypervisor.

12. One or more computer-readable storage devices according to claim 8, the process further comprising receiving the one or more network-level at the guest operating system of the VM.

13. One or more computer-readable storage devices according to claim 12, the process further comprising passing the one or more network-level packets to a guest agent running on the guest operating system.

14. A method comprising:
executing a hypervisor on a host, the hypervisor managing and executing a virtual machine (VM);
executing an agent by the hypervisor, wherein the agent does not execute within any VMs managed by the hypervisor;
receiving a network-level packet by the host, the network-level packet conforming to a network-level protocol and comprising a network-level header comprising a network address of the host, the network-level packet having been routed by a physical data network to the host based on the network address of the host, the network-level packet comprising a payload comprising an application-level message generated and sent through a network stack of a remote host by a remote application executing on the remote host, wherein the VM running on the host is unaddressable by the remote application executing on the remote host, causing the network-level packet to be directed to a network address of the hypervisor of the host, the application-level message carried by the network-level protocol comprising a VM identifier that identifies the VM;
extracting, by a network stack of the hypervisor running on the host, the application-level message from the network-level packet and passing the application-level message to the agent, and in response to receiving the application-level message the agent parses the application-level message to obtain the VM identifier therefrom, and based on the obtained VM identifier the agent determines that, among VMs managed by the hypervisor, the application-level message is to be sent to the identified VM; and
responsive to the agent determining that the application-level message is to be sent to the identified VM, causing, by the agent, the application-level message to be passed through the network stack of the hypervisor from the hypervisor to the VM, and further responsive to the agent determining that the application-level message is to be passed to the VM, a network stack of the VM extracts the application-level message from a second network-level packet and delivers the application-level message to a local application that processes the application-level message.

15. A method according to claim 14, wherein the network-level packet and the second network-level packet both conform to the network-level protocol.

16. A method according to claim 14, wherein the application-level message is passed from the hypervisor to the VM via a private network connection between the hypervisor and the VM.

17. A method according to claim 14, further comprising, for a plurality of VMs, maintaining mapping information indicating which VMs are associated with which host addresses, and wherein the network-level packet is directed to the network address of the hypervisor of the host based on the mapping information.

18. A method according to claim 14, wherein the agent comprises a hypertext transfer protocol (HTTP) proxy, and wherein the application-level message comprises an HTTP message.

* * * * *